(12) United States Patent  
Zehavi

(10) Patent No.: US 6,894,988 B1  
(45) Date of Patent: May 17, 2005

(54) WIRELESS APPARATUS HAVING MULTIPLE COORDINATED TRANSCEIVERS FOR MULTIPLE WIRELESS COMMUNICATION PROTOCOLS

(75) Inventor: Ephraim Zehavi, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/408,725

(22) Filed: Sep. 29, 1999

(51) Int. Cl.[7] .............................................. H04B 7/005
(52) U.S. Cl. ........................ 370/278; 370/328; 370/465
(58) Field of Search ................................. 370/278, 280, 370/328, 334, 338, 465, 466, 468, 282, 294, 467, 469

(56) References Cited

U.S. PATENT DOCUMENTS

| | | | |
|---|---|---|---|
| 5,754,947 A | | 5/1998 | Tanabe et al. |
| 5,852,405 A | | 12/1998 | Yoneda et al. |
| 5,875,186 A | | 2/1999 | Belanger et al. |
| 5,926,479 A | * | 7/1999 | Baran .......................... 370/465 |
| 5,983,098 A | * | 11/1999 | Gerszberg et al. ........... 455/426 |
| 6,058,106 A | * | 5/2000 | Cudak et al. ................ 370/313 |
| 6,128,490 A | * | 10/2000 | Shaheen et al. ............. 455/434 |
| 6,374,109 B1 | * | 4/2002 | Shaheen et al. ............. 455/434 |
| 6,411,825 B1 | * | 6/2002 | Csapo et al. ................. 455/561 |

FOREIGN PATENT DOCUMENTS

| | | |
|---|---|---|
| EP | 0 812 069 | 12/1997 |
| WO | WO 99 16266 | 4/1999 |
| WO | WO 99/29126 | 6/1999 |

OTHER PUBLICATIONS

Ogose, Shigeaki "Application of Software Radio to the Third Generation Mobile Telecommunications" IEEE Feb. 1999, pp. 1212–1216.*

Bilgic, Murat "A PCS Terminal Architecture to Access Multiple Networks" IEEE May 1996, pp. 1160–1164.*

* cited by examiner

Primary Examiner—Chi Pham  
Assistant Examiner—Anh-Vu Ly  
(74) Attorney, Agent, or Firm—James S. Finn

(57) ABSTRACT

A wireless device is provided with a first and a second wireless transceivers to transmit and receive signals wirelessly in accordance with a first and a second protocol, respectively. The wireless device is further provided with a first and a second controller manager to control, in a coordinated manner, the transmit and receive operations of the first and second wireless transmitters. In various embodiments, the wireless device is further provided with at least one time sharing state machine to facilitate the coordinated control of the wireless transceivers. In some of these embodiments, the wireless device is further provided with a workload monitor to cooperate with the at least one time sharing machine to facilitate the coordinated control be adaptively performed, based at least in part on transmit and receive workloads of the two protocols. In various embodiments, the protocols may be selected pairs of Bluetooth, 802.11 FH, 802.11 D, 802.11 High Data Rate, Home RF and the like. The wireless device may also be used as a master device or a gateway device of two wireless networks.

2 Claims, 4 Drawing Sheets

WIRELESS APPARATUS HAVING MULTIPLE COORDINATED TRANSCEIVERS FOR MULTIPLE WIRELESS COMMUNICATION PROTOCOLS

BACKGROUND OF THE INVENTION

1. Field of the Invention

The present invention relates to the field of wireless communication. More specifically, the present invention relates to the problem of concurrent wireless communication with multiple communication partners of different wireless communication protocols.

2. Background Information

Advances in microprocessor and communication technology have led to the increase in popularity of wireless communication. Once confined to the privileged, wireless voice communication has become affordable and available to the masses. Today, various efforts are under way to apply wireless communication to replace attachment cables used for attaching peripheral devices, such as printers, scanners and the like, as well as networking cables used for connecting clients, servers and the like. A leading candidate to accomplish the former is commonly known to those skilled in the art as the Bluetooth technology or Bluetooth protocol. Examples of technology to accomplish the later include the different variants of the IEEE 802.11 Standard published by the Institute of Electrical and Electronic Engineers, 802.11 FH, 802.11 D, 802.11 High Data Rate, as well as Home RF.

A need has emerged in a number of applications that it is desirable for a device to be able to operate "concurrently" in multiple wireless protocols. One such application is having a notebook computer being able to communicate with peripheral devices such as a phone, a printer, a scanner and the like, in accordance with the Bluetooth protocol; and with other computing devices, such as other peer computers or servers, communication devices, such as modems or adapters, and networking devices, such as gateways, routers, switches and the like, in accordance with one of the 802.11 protocols or Home RF.

However, the need cannot be met by simply providing the device with multiple transmitters, one for each protocol. The reason is because if multiple ones of these transmitters were to transmit at the same time, the transmitters would interfere with each other. This would result in corruption and/or loss of data, as well as degradation in performance.

As will be described in more detail below, the present invention substantially addresses this need in a very efficient and low cost manner. This and other advantages of the present invention will be readily apparent from the description to follow.

SUMMARY OF THE INVENTION

A wireless device is provided with a first and a second wireless transceivers to transmit and receive signals wirelessly in accordance with a first and a second protocol, respectively. The wireless device is further provided with a first and a second controller manager to control, in a coordinated manner, the transmit and receive operations of the first and second wireless transmitters.

In various embodiments, the wireless device is further provided with at least one time sharing state machine to facilitate the coordinated control of the wireless transceivers. In some of these embodiments, the wireless device is further provided with a workload monitor to cooperate with the at least one time sharing machine to facilitate the coordinated control be adaptively performed, based at least in part on transmit and receive workloads of the two protocols.

In various embodiments, the protocols may be selected pairs of Bluetooth, 802.11 FH, 802.11 D, 802.11 High Data Rate, Home RF and the like. The wireless device may also be used as a master device or a gateway device of two wireless networks.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using software terminology commonly employed by those skilled in the art to convey the substance of their work to others skilled in the art. As well understood by those skilled in the art, these software quantities take the form of electrical, magnetic, or optical signals capable of being stored, transferred, combined, and otherwise manipulated through mechanical and electrical components of a digital system; and the term digital system includes general purpose as well as special purpose processors, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
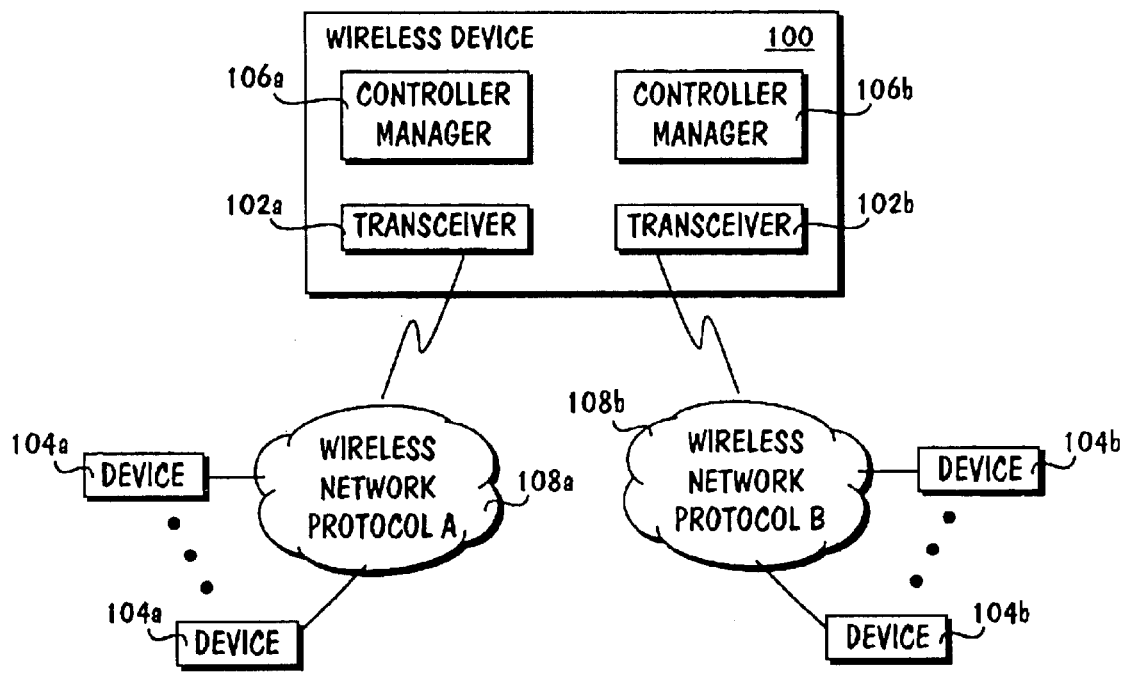
FIG. 1 illustrates the wireless device with multiple coordinated transceivers of the present invention, in accordance with one embodiment.

Referring now to FIG. 1, wherein an overview of the present invention is shown. As illustrated, wireless device 100 is provided with wireless transceivers 102a and 102b to transmit and receive signals wirelessly in accordance with a first and a second wireless communication protocol, to enable device 100 to be communicatively coupled to devices 104a and devices 104b of wireless networks 108a and 108b respectively. Wireless device 100 further include controller managers 106a and 106b to control the operation of wireless transceivers 102a and 102b respectively. As will be described in more detail below, controller managers 106a and 106b control transmits and receives by wireless transceivers 102a and 102b, in a coordinated manner, in accordance with the present invention, to allow wireless device 100 to operate with devices 104a and devices 104b of wireless network 108a and 108b in accordance with the respective wireless communication protocols at the same time.

Figure 2:
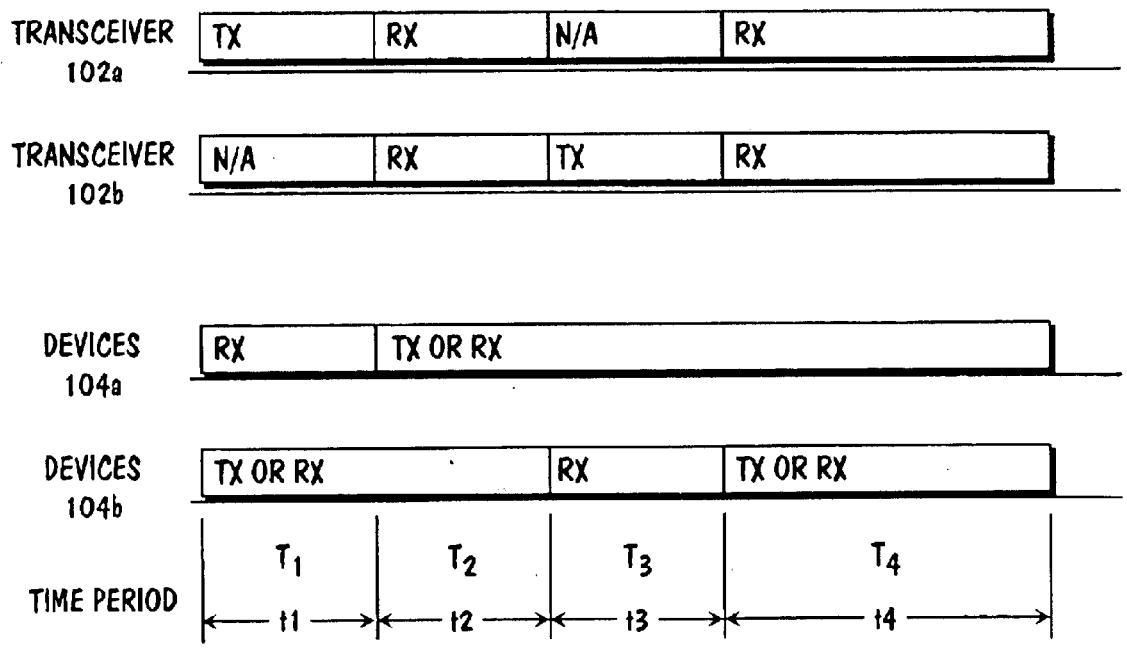
FIG. 2 illustrates a period of operation during which a pair of coordinated transceivers of the present invention alternate between transmits by one of the two transceivers and receives by both of the two transceivers.

In one embodiment, controller managers 106a and 106b control transmits and receives by wireless transceivers 102a and 102b (hereinafter, simply transceivers), in a periodic fashion. More specifically, in this embodiment, controller. managers 106a and 106b control transceivers 102a and 102b to alternate between transmits by one of the two transceivers and receives by both of the two transceivers. FIG. 2 illustrates a period of operation in accordance with this embodiment. As shown, in time period T1, for duration t1, control manager 106a controls transceiver 102a to perform transmit of signals to devices 104a of wireless network 108a (hereinafter, simply network) in accordance with the first wireless communication protocol (hereinafter, simply protocol), while control manager 106b controls transceiver 102b to neither perform transmit nor receive of signals to and from devices 104b of network 108b. In time period T3, for duration t3, the reverse is performed. Control manager 106b controls transceiver 102b to perform transmit of signals to devices 104b of network 108b in accordance with the second protocol, while control manager 106a controls transceiver 102a to neither perform transmit nor receive of signals to and from devices 104a of network 108a. In time periods T2 and T4, for duration t2 and t3 respectively, control managers 106a and 106b control both transceivers 102a and 102b to perform receive of signals from devices 104a and 104b of network 108a and 108b in accordance with the respective protocols respectively.

Since all wireless protocols operate on either a carrier sense or contention free protocol, devices 104a are able to receive in time period T1, and transmit when there are packets to transmit, but otherwise receive, in time periods T2–T4. Likewise, devices 104b are able to receive in time period T3, and transmit when there are packets to transmit, but otherwise receive, in time periods T1–T2 and T4.

Accordingly, wireless device 100 is able to operate with devices 104a and 104b of networks 108a and 108b in two wireless protocols at the same time.

Note that time periods T1 –T4 may or may not be equal in duration. That is, numerically t1–t4 may or may not be equal. As will be described in more detail below, in different variants of this embodiment, duration t1 –t4 of time periods T1 –T4 are dynamically and adaptively set. In particular, in some variants, duration t1–t4 of time periods T1–T4 are adaptively set based at least in part of transmit and receive workloads of networks 108a and 108b.

Referring back to FIG. 1, except for the teachings of the present invention incorporated in wireless device 100 to effectuate the above described coordinated manner of operation of transceivers 102a and 102b, transceivers 102a and 102b as well as controller managers 106a and 106b are otherwise intended to represent a broad range of these elements known in the art. Accordingly, except for the teachings of the present invention, which will be further described below, transceivers 102a and 102b and controller managers 106a and 106b will not be otherwise further described.

Wireless device 100 is intended to represent a wide range of devices that can benefit from having the ability to wirelessly operate with other wireless devices in two or more wireless communication protocols at the same time. Examples of device 100 include but not limited to computers of various form factors, such as desktop, notebook, palm size and so forth, controller devices (i.e. master devices) to manage and control the operation of networks 108a and 108b, and gateway devices to facilitate communication between devices 104a and devices 104b.

Likewise, devices 104a and 104b are intended to represent a broad range of devices that can benefit from being able to communicate wirelessly. Examples of devices 104a include but not limited to phones, video cameras, speakers, modems, printers and scanners equipped to wireless communicate in accordance with the Bluetooth protocol. Examples of devices 104b include clients and servers, as well as gateways, modems, hubs, routers, and switches equipped to wireless communicate in accordance with a selected variant of the IEEE 802.11 protocols or Home RF.

For ease of understanding, only two groups of devices 104a and 104b, communicating in accordance with the first and second wireless communication protocols are shown in FIG. 1. However, from the description to follow, it will be readily apparent to those skilled in the art, the present invention may be practiced with more than two transceivers (as long as the transceivers are likewise coordinated).

Figure 3:
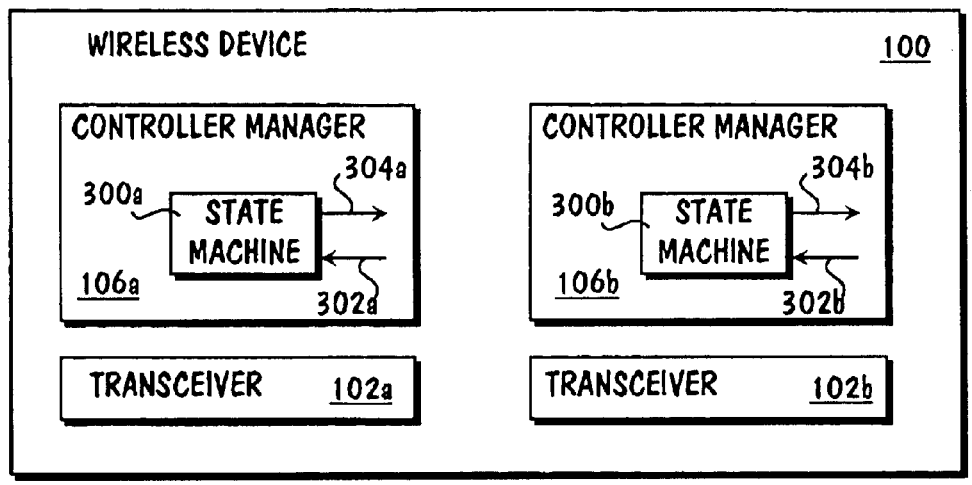
FIG. 3 is a block diagram illustrating a wireless device with multiple coordinated transceivers in accordance with one embodiment of the present invention.
Figure 4:
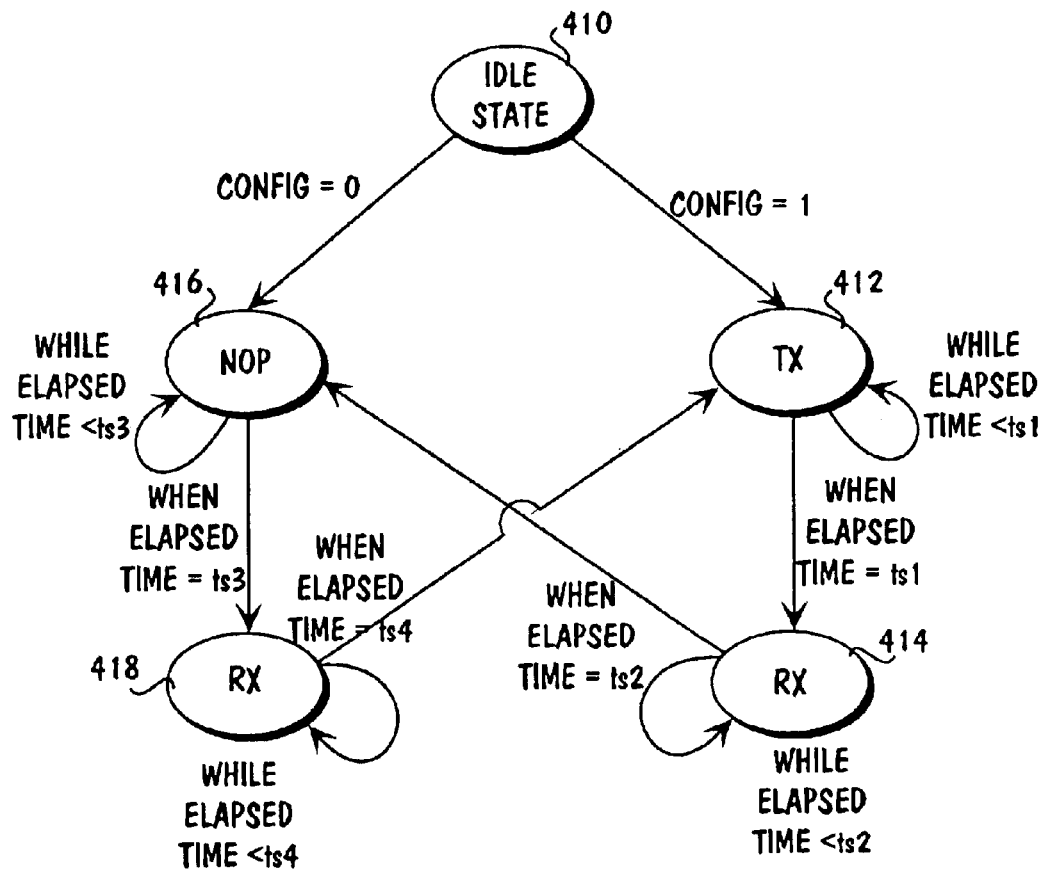
FIG. 4 is a state diagram representative of the operation of the wireless device of FIG. 3.

Referring now to FIGS. 3 and 4, wherein a block diagram and a state diagram illustrating wireless device 100 of FIG. 1 in further detail, in accordance with one embodiment, are shown. As illustrated, each controller manager 106a/106b of wireless device 100 is endowed with a state machine 300a/300b to complementarily assist the controller manager 106a/106b to control its transceiver 102a/102b in the above described coordinated manner. More specifically, each state machine 300a/300b, in addition to idle state 410, has four operating states 412–418 (TX, RX1, NOP, and RX2) to output a signal 304a/304b denoting a selected one of a transmit (TX) operation, a receive (RX) operation and no-op (NOP) for its controller manager 106a/106b.

Upon power-on or reset, each state machine 300a/300b either transitions from idle state 410 to TX state 412 or NOP state 416, depending on the state of configuration (config) signal 302a/302b. One state machine, e.g. 300a, is configured to transition from idle state 410 to TX state 412, while the other state machine, e.g. 300b, is configured to transition from idle state 410 to TX state 412. Config signal 302a/302b may be set e.g. via a jumper or other equivalent means, as well as through software.

While in TX state 412, state machine 300a/300b remains in the state for duration ts1, outputting signal 304a/304b denoting TX operation for its controller manager 1026a/106b. In one embodiment, where t1 and t3 may take on different values, one state machine, e.g. 300a, is configured with ts1 set to t1, while the other state machine, e.g. 300b, is configured with ts1 set to t3. Ts1 may be selectively set in any one of a number of techniques known in the art, e.g. through separate registers or multiplexing circuitry. Upon expiration of ts1, state machine 300a/300b transitions from TX state 412 to RX1 state 414.

While in RX1 state 414, state machine 300a/300b remains in the state for duration ts2, outputting signal 304a/304b denoting RX operation for its controller manager 106a/106b. In one embodiment, where t2 and t4 may take on different values, one state machine, e.g. 300a, is configured with ts2 set to t2, while the other state machine, e.g. 300b, is configured with ts2 set to t4. Ts2 may likewise be selectively set in any one of a number of techniques known in the art. Upon expiration of ts2, state machine 300a/300b transitions from RX1 state 414 to NOP state 416.

While in NOP state 416, state machine 300a/300b remains in the state for duration ts3, outputting signal 304a/304b denoting NOP for its controller manager 106a/106b. In one embodiment, where t1 and t3 may take on different values, one state machine, e.g. 300a, is configured with ts3 set to t3, while the other state machine, e.g. 300b, is configured with ts3 set to t1. Ts3 may likewise be selectively set in any one of a number of techniques known in the art. Upon expiration of ts3, state machine 300a/300b transitions from NOP state 416 to RX2 state 418.

While in RX2 state 418, state machine 300a/300b remains in the state for duration ts4, outputting signal 304a/304b denoting RX operation for its controller manager 106a/106b. In one embodiment, where t2 and t4 may take on different values, one state machine, e.g. 300a, is configured with ts4 set to t4, while the other state machine, e.g. 300b, is configured with ts4 set to t2. Ts4 may likewise be selectively set in any one of a number of techniques known in the art. Upon expiration of ts4, state machine 300a/300b transitions from RX2 state 418 to TX state 412.

From TX state 412, state machine 300a/300b continues operation as described earlier.

Figure 5:
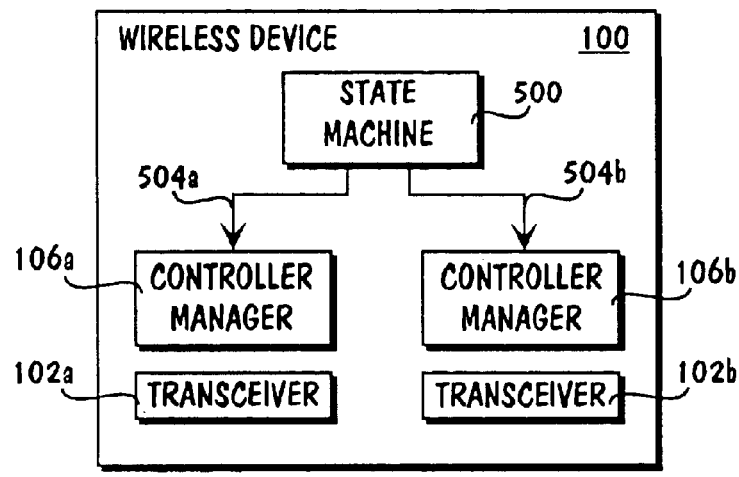
FIG. 5 is a block diagram illustrating a wireless device with multiple coordinated transceivers in accordance with another embodiment of the present invention.
Figure 6:
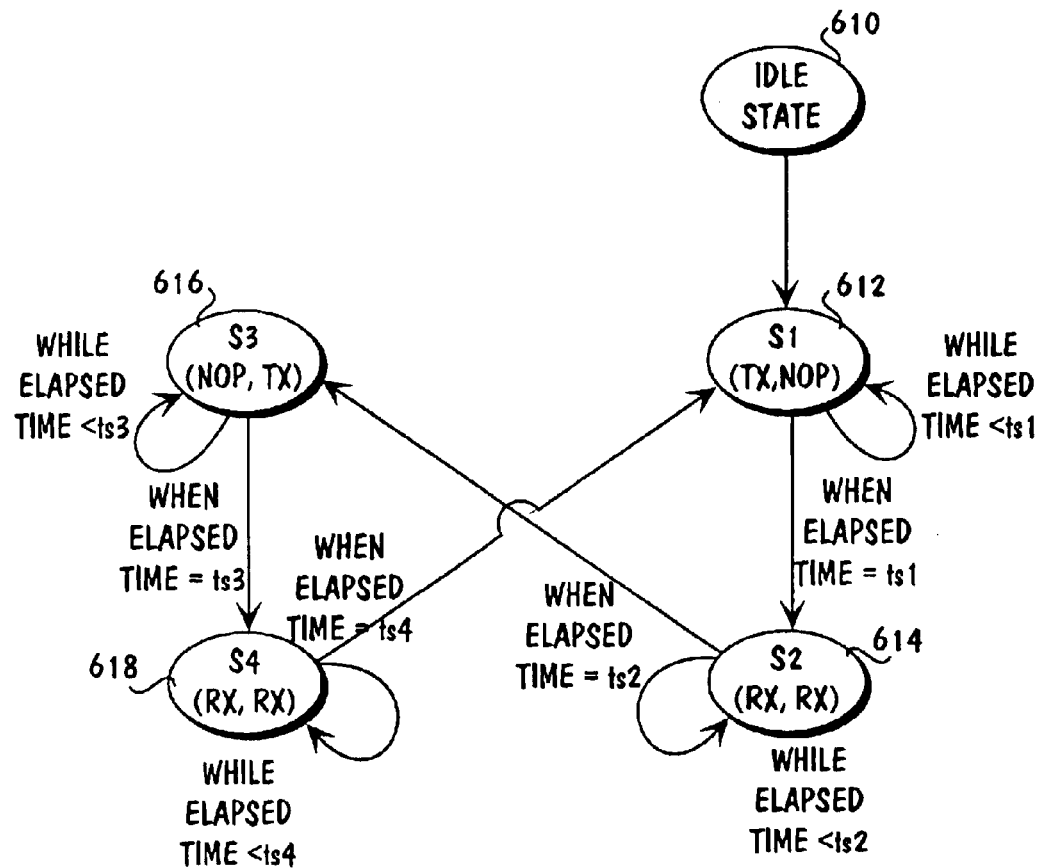
FIG. 6 is a state diagram representative of the operation of the wireless device of FIG. 5.

Referring now to FIGS. 5 and 6, wherein a block diagram and a state diagram illustrating wireless device 100 of FIG. 1 in further detail, in accordance with another embodiment, are shown. As illustrated, for this embodiment, instead of having each controller manager 106a/106b of wireless device 100 be endowed with a state machine to complementarily assist the controller manager 106a/106b to control its transceiver 102a/102b in the above described coordinated manner, wireless device 100 is endowed with a single state machine 500 to assist both controller managers 106a and 106b. Similarly, state machine 500, in addition to idle state 610, has four operating states 612–618 (S1–S4) to output a pair of signals 504a–504b denoting a selected combination of operations, TX with NOP, both RX, and NOP with TX for controller managers 106a and 106b.

Upon power-on or reset, state machine 500 transitions from idle state 610 to S1 state 612. While in S1 state 612, state machine 500 remains in the state for duration ts1, outputting signal 504a-504b denoting TX and NOP for controller managers 106a and 106b. Ts1 is set to t1. Upon expiration of ts1, state machine 500 transitions from S1 state 612 to S2 state 614. While in S2 state 614, state machine 500 remains in the state for duration ts2, outputting signal 504a–504b denoting RX for both controller managers 106a and 106b. Ts2 is set to t2. Upon expiration of ts2, state machine 500 transitions from S2 state 614 to S3 state 616.

While in S3 state 616, state machine 500 remains in the state for duration ts3, outputting signal 504a–504b denoting NOP and TX for controller managers 106a and 106b. Ts3 is set to t3. Upon expiration of ts3, state machine 500 transitions from S3 state 616 to S4 state 618. While in S4 state 618, state machine 500 remains in the state for duration ts4, outputting signal 504a-504b denoting RX for both controller managers 106a and 106b. Ts4 is set to t4. Upon expiration of ts4, state machine 500 transitions from S4 state 618 to S1 state 612.

From S1 state 612, state machine 500 continues operation as described earlier.

Figure 7:
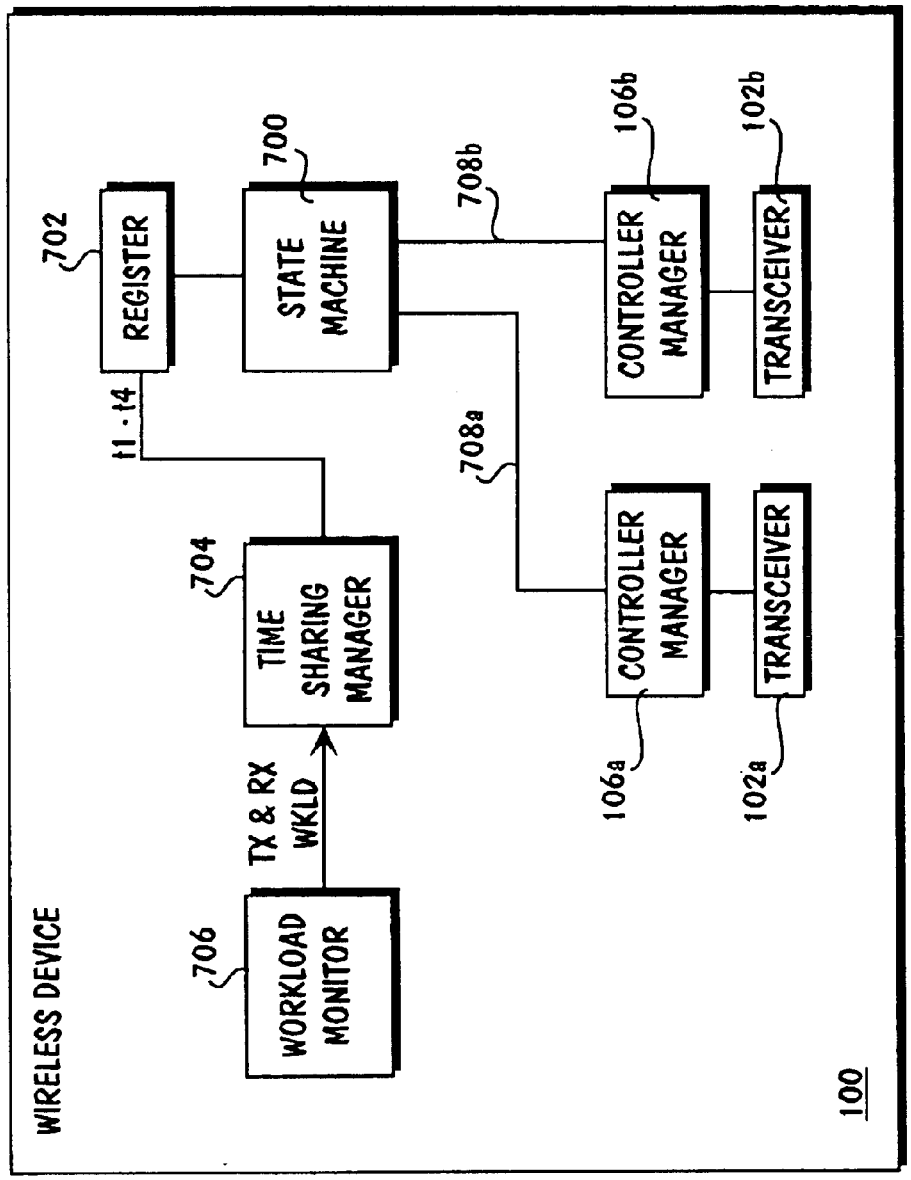
FIG. 7 is a block diagram illustrating a wireless device with multiple coordinated transceivers in accordance with yet another embodiment of the present invention.

Referring now to FIG. 7, wherein a block diagram illustrating wireless device 100 of FIG. 1 in further detail, in accordance with yet another embodiment, is shown. As illustrated, for this embodiment, in addition to having wireless device 100 be endowed with a single state machine 700 to assist both controller managers 106a and 106b as described earlier (with signals 708a—708a denoting TX-NOP, RX-RX or NOP-TX), wireless device 100 is further endowed with register 702, time sharing manager 704, and workload monitor 706 operatively coupled to each other and state machine 700 as shown. Register 702 stores t1–t4 for state machine 700. Time sharing manager 704 dynamically adjusts t1–t4 to enable state machine 700 be able to adaptively assist controller managers 106a and 106b in controlling transceivers 102a and 102b. For the illustrated embodiment, time sharing manager 704 dynamically adjusts t1–t4 based at least in part on transmit and receive workloads of networks 108a and 108b. Transmit and receive workloads are monitored by workload monitor 706 and provided to time sharing manager 704.

Register 702 may be constituted with any storage circuitry known in the art. Time sharing manager 704 and workload monitor 706 may be implemented with any combinatorial logic or in software.

Thus, a wireless device equipped to substantially operate currently with multiple wireless communication protocols has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
   a first and a second wireless transceiver to transmit and receive signals in accordance with a first and a second protocol to and from network devices communicatively coupled to the apparatus via a first and a second wireless network respectively; and
   a first and a second controller manager coupled to the first and second wireless transceivers to control the first and second wireless transceivers to perform said transmits and receives in a coordinated manner in accordance with a time sharing schedule and further wherein the first and second controller managers include a first and a second time sharing state machine respectively, with the first and second state machine complementarily configured to cause the first and second controller managers to control the first and second transceivers in complementary transmit, receive and suspend states, in accordance with the time sharing schedule;
   a time sharing state machine coupled to the first and second controller managers to cause the first and second controller managers to control the first and second transceivers in complementary transmit, receive and suspend states, in accordance with the time sharing schedule; and
   a time sharing manager to adaptively manage the time sharing schedule, wherein the time sharing manager adaptively manages the time sharing schedule based at least in part on transmit or receive workloads of said first and second wireless networks.

2. The apparatus of claim 1, wherein the apparatus further includes a workload monitor to track transmit or receive workloads of said first and second wireless networks.

* * * * *